United States Patent
Morgulis et al.

[11] 3,975,911
[45] Aug. 24, 1976

[54] TURBOCHARGER

[76] Inventors: Jury Borisovich Morgulis, Schelkovsky proezd, 15, korpus 2, kv. 34; German Mitrofanovich Povetkin, Khoroshevskoe shosse, 68, korpus 5, kv. 54; Valery Naumovich Kaminsky, Komsomolsky prospekt, 14/1, kv. 29; Vyacheslav Alexandrovich Kochetov, ulitsa Shirokaya, 19, korpus 2, kv. 14, all of Moscow, U.S.S.R.

[22] Filed: Dec. 27, 1974

[21] Appl. No.: 537,108

[52] U.S. Cl. .................... 60/602; 415/146; 415/158
[51] Int. Cl.² ........................................ F02D 23/00
[58] Field of Search .......... 415/146, 147, 148, 157, 415/158; 60/602

[56] References Cited
UNITED STATES PATENTS

| | | | |
|---|---|---|---|
| 1,322,810 | 11/1919 | Moody | 415/158 |
| 2,803,396 | 8/1957 | Darrow | 415/146 |
| 3,032,259 | 5/1962 | Jassniher | 415/158 |
| 3,102,382 | 9/1963 | Bozzola | 60/602 |
| 3,257,796 | 6/1966 | Updike | 60/602 |
| 3,625,003 | 12/1971 | Liddle et al. | 415/157 |

*Primary Examiner*—Wendell E. Burns
*Assistant Examiner*—David D. Reynolds
*Attorney, Agent, or Firm*—Steinberg and Blake

[57] ABSTRACT

A turbocharger comprising a compressor casing with a compressor impeller accommodated therein; a turbine casing with a turbine wheel accommodated therein and mounted on a shaft which also mounts said compressor impeller; and an intermediate casing which couples the compressor casing to the turbine casing. Provided in the turbine casing are two adjacent passages each of which serves the purpose of carrying exhaust gases to one half of the turbine wheel. The passages are isolated from each other at the inlet to the turbine wheel by means of two partitions. A disk to protect the intermediate casing against the effects of exhaust gas heat is mounted coaxially with the shaft between the intermediate casing and the turbine casing. The disk is held against the partitions by springs located in the intermediate casing and is adapted to be moved axially along the shaft by the agency of the difference between the pressures exerted by the exhaust gases and the springs.

3 Claims, 3 Drawing Figures

TURBOCHARGER

This invention relates to turbocharger engineering and has particular reference to turbochargers. It can be used with particular advantage for supercharging internal combustion engines designed to power automobiles and tractors.

In order to increase the maximum torque developed by supercharged internal combustion engines powering automobiles and tractors, use is made of turbochargers incorporating controlled turbines. The term "controlled turbine" means herein a turbine adapted to have its power output varied so as to maintain the boost pressure in accordance with the engine load and rotational speed. The variation of the turbine power output is effected by one of the following means: changing the velocity of the gases flowing from the engine exhaust manifold to the turbine wheel; by-passing a portion of gases into the atmosphere or by-passing the gases from a high-pressure section of the engine exhaust manifold to a low-pressure section; changing the flow area of the turbine. Reduction of the turbine power output results in a slower turbocharger rotor speed and, consequently, in a lower boost pressure.

The need for employing controlled-turbine turbochargers arises from the fact that engine torque decreases when the engine slows down with consequent reduction of the rate of gas flow through the turbine, compressor rotor speed and boost pressure. With the engines designed to power automobiles and tractors, however, it is required that when the engine slows down at full throttle its torque should increase, reaching the maximum value at a rotational speed of approximately 50–70 percent of the rated rpm. This condition enables increasing resistance to the vehicle movement to be overcome without frequent gearchanges. To meet this condition, the turbines involved are designed so as to provide a sufficiently high power output and boost pressure at the maximum torque, with the engine running at a decreased speed. Consequently, when the engine operates at the rated speed, the boost pressure becomes excessive, causing overpressure in the engine cylinders and overstress on the pistons, connecting rods, crankshaft and other parts, there arising a hazard of breakage and engine failure.

The use of controlled turbines makes it possible to obviate excessive boost pressures at the rated speed. Also, it makes it possible to increase engine power at higher altitudes.

It is known to use a turbocompressor with a controlled radial turbine, for example the Garret turbocompressor. The turbocompressor concerned comprises a compressor casing, a turbine casing having one or two adjacent passsges for the gases to flow from the engine exhaust manifold to the turbine wheel, and an intermediate casing (a bearing housing) which couples the compressor and turbine casings. The compressor impeller and the turbine wheel are housed in their respective casings and mounted on a common shaft.

The power output of the turbine is controlled by a release valve in conjunction with a spring-loaded servo-piston. The release valve is arranged to open the engine exhaust manifold to the atmosphere. The space at the servo-piston face communicates via a pipeline with the engine inlet manifold into which the compressor feeds the boost air. When the boost pressure acting on the servopiston rises sufficiently to overcome the force of the servopiston spring, the release valve opens and exhausts a part of the gases into the atmosphere. The reduction of the quantity of the gases operating the turbine entails decrease in the turbine power output and, consequently, in the compressor boost.

The controlled-turbine turbocompressor under consideration suffers from the disadvantage that the auxiliaries (the release valve, spring-loaded servopiston and piping) incorporated therein complicate the engine construction, raise the manufacturing costs and increase the overall dimensions.

It is also known to use a turbocompressor with a controlled radial impulse turbine. This turbocompressor comprises a compressor casing; a turbine casing having two adjacent passages for the gases to flow from the engine exhaust manifold to the turbine wheel, said passages being isolated from each other at the inlet to the turbine wheel by means of a partition; and an intermediate casing (a bearing housing) which couples the compressor and turbine casings. The compressor impeller and the turbine wheel are housed in their respective casings and mounted on a common shaft. The turbine communicates with the engine exhaust manifold which is divided into two sections communicating with the engine cylinders. Following the engine firing order, the exhaust gas pressure rises periodically in one or the other section of the exhaust manifold. The partition which separates the two sections of the exhaust manifold from each other mounts a by-pass valve with a spring-loaded servopiston. The space at the servopiston face communicates with the engine exhaust manifold. When the boost pressure reaches the predetermined value, the servopiston opens the by-pass valve for the exhaust gases to pass from the high-pressure section of the manifold into the low-pressure section. As a result, the gas energy, turbine power output and boost pressure decrease.

The controlled turbine described above suffers from the disadvantage that the construction of the engine exhaust manifold is complicated and the manufacturing costs are raised by the fitting of the by-pass valve and associated auxiliaries.

It is well known to use a turbocompressor comprising a compressor casing, a turbine casing and an intermediate casing (a bearing housing) which couples the compressor and turbine casings. The compressor impeller and turbine wheel are housed in their respective casings. Provided in the turbine casing are two adjacent passages for the gases to flow from the engine exhaust manifold to the turbine wheel. Each passage carries the gases to one half of the turbine wheel. At the inlet to the turbine wheel the gas passages are isolated from each other by means of two partitions. The compressor impeller and the turbine wheel are mounted on a common shaft. To protect the intermediate casing against the effects of heat from the exhaust gases passing from the engine to the turbine wheel, a disk is mounted coaxially with the rotor shaft between the turbine wheel and the intermediate casing, said disk being pressed against the partitions separating the gas passages in the turbine casing. The gas passages communicate with the respective sections of the exhaust manifold. Following the engine firing order, the pressure of the exhaust gases rises periodically in one or the other section of the exhaust manifold and, consequently, in the turbine casing gas passages communicating therewith. This turbocompressor suffers from the disadvantage attendant upon the turbocompressors employing an uncontrolled turbine, viz.: when engine speed decreases with load increase, the rate of gas flow through the turbine diminishes, the turbocompressor rotor slows down and the boost pressure drops, resulting in torque decrease. This adversely affects the capability of the engine to overcome increasing resistance without gear-change.

It is an object of the present invention to provide a controlled-turbine turbocharger that will be practically as simple in construction as turbocompressors employing an uncontrolled turbine, there being no substantial difference therefrom in manufacturing labor and cost.

According to the present invention, there is provided a turbocharger comprising: a compressor casing; a compressor impeller housed in said compressor casing; a turbine casing; a turbine wheel housed in said turbine casing; an intermediate casing arranged to couple said compressor and turbine casings; a shaft passing through said casings and carrying said compressor impeller and turbine wheel thereon; two adjacent passages provided in said turbine casing, each of which carries exhaust gases to one half of the turbine wheel, said passages being isolated from each other at the inlet to said turbine wheel; two partitions insulating said passages from each other at the inlet to said turbine wheel; a disk to protect said intermediate casing against the effects of exhaust gas heat, which disk is mounted coaxially with said shaft between said turbine and intermediate casings, being adapted to move axially along said shaft and to be pressed against said partitions; springs located in said intermediate casing for the purpose of purpose of pressing said disk against said partitions.

It is desirable that guides be provided in said turbine casing for the disk to move axially along the shaft. It is possible that said guides be provided in the intermediate casing.

The disk is adapted to move axially along the shaft due to difference between the pressure exerted by the exhaust gases passing to the turbine wheel and the pressure exerted by the springs, thereby effecting automatic control of the boost pressure. The automatic control action is as follows. Increase in the engine speed causes increase in the rate of gas flow, turbine power output and boost pressure. The turbine inlet pressure rises and, consequently, the pressure exerted by the gases on the disk increases until it forces the disk away from the turbine wheel against the effort of the springs, a gap being formed between the disk and the partitions which separate the gas passages in the turbine casing. Via this gap the gases pass from the high-pressure passage into the low-pressure passage. As a result, the turbine power output and the rotor speed decrease. The boost pressure lowers and the maximum gas pressure in the engine cylinder diminishes, whereby the stresses on the associated engine parts are lessened.

The turbocompressor wherein the power output of the turbine is controlled by means of a spring-loaded disk adapted to move axially practically does not differ in the simplicity of the construction, manufacturing labor and cost from uncontrolled-turbine turbocompressors, since control is obtained by merely employing a few springs and guides to prevent the disk from misalignment during its axial movement. The labor and cost involved in the manufacture of the springs and guides (for example, in the form of pins) are fairly low.

If the flange on the turbine end of the intermediate casing is substantially large, the guides may be fitted in said casing, otherwise it is desirable that the guides be fitted in the turbine casing.

Switching over to the manufacture of controlled-turbine turbochargers according to the present invention can be carried out witout substantial changes in the production process and within a short time, there being practically no need for additional outlay.

Another advantage featured by the turbocharger which constitutes the present invention is that it is completely interchangeable with the turbocompressors known hitherto.

Now the invention will be described in detail with reference to the accompanying drawings in which.

Figure 1:
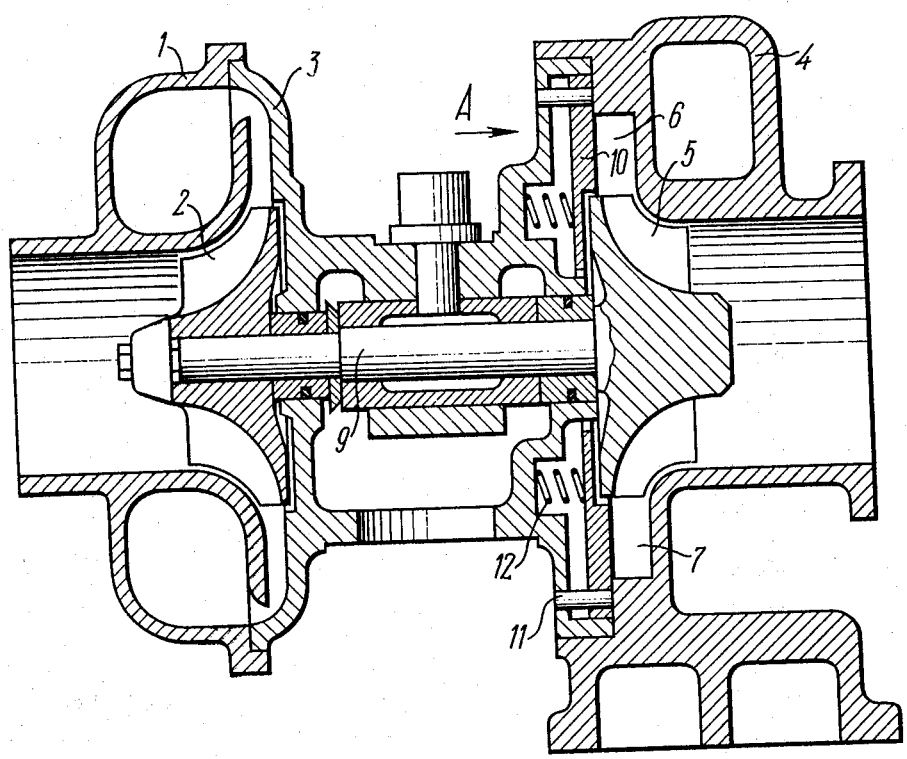
FIG. 1 is a longitudinal sectional view of the turbocompressor according to the invention.

The turbocharger intended, for example, for use on an automobile or tractor engine comprises a compressor casing 1 (FIG. 1) with a compressor impeller 2 accommodated therein, an intermediate casing 3 and a turbine casing 4 wherein is housed a turbine wheel 5.

Figure 2:
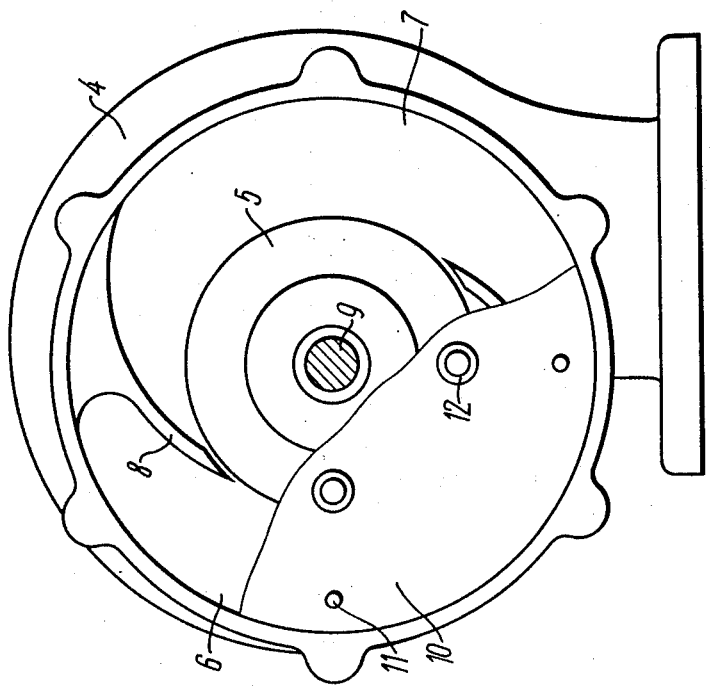
FIG. 2 is a cutaway view of the disk taken in the direction of the arrow A, with the intermediate casing removed.

The intermediate casing 3 couples the compressor casing 1 to the turbine casing 4. Provided in the turbine casing 4 are two adjacent passages 6 and 7 for the exhaust gases to flow from the sections of the exhaust manifold of the internal combustion engine (not shown) to the turbine wheel 5. The sections of the exhaust manifold communicate with the engine cylinders. Each passage 6 or 7 carries the exhaust gases to one half of the turbine wheel 5. At the inlet to the turbine wheel 5 the passages 6 and 7 are isolated from each other by means of two partitions 8 (FIG. 2). The compressor impeller 2 (FIG. 1) and the turbine wheel 5 are mounted on a common shaft 9.

To protect the intermediate casing 3 against the effects of exhaust gas heat, a disk 10 is fitted between said intermediate casing 3 and the turbine casing 4, said disk forming the front wall of the turbine casing 4.

The disk 10 is mounted coaxially with the shaft 9 and is adapted to move axially along the shaft 9.

To enable the disk 10 to move axially, provision is made of guides 11 constructed, for example, in the forms of pins and fitted in the intermediate casing 3. Located in the intermediate casing 3 are springs 12 which force the disk 10 against the partitions 8.

The turbocharger operates as follows. Following the engine firing order, the exhaust gases pass into the sections of the exhaust manifold of the internal combustion engine (not shown). When the exhaust gases enter one of the exhaust manifold sections, the gas pressure therein rises, causing pressure build-up in the turbine casing passage communicating therewith, for example, passage 6. The exhaust gases delivered through the passages 6 and 7 flow at a high velocity through the turbine wheel 5, imparting rotation thereto and to the compressor impeller 2 mounted on the common shaft 9. The compressor forces the air into the cylinders of the internal combustion engine. When the engine speeds up, the rate of flow of the exhaust gases through the turbine wheel 5 rises and the velocity of the gases increases. In consequence, the power output of the turbine and the rotational speed of the turbine wheel 5 and compressor impeller 2 increase, causing increase in the boost pressure. Accordingly, the gas pressure in the turbine rises. When the gas pressure exerted on the disk 10 overcomes the force of the springs 12, the disk 10 is forced to move axially on the guides 11 towards the compressor, a gap being formed between the disk 10 and the partitions 8 which separate the passages 6 and 7 from each other. From the passage where the gas pressure at the moment is higher, for example, from the passage 7, the gases pass via the gap into the passage 6 where the gas pressure is lower. As a result, the velocity of the gases flowing through the turbine wheel 5 decreasas with consequent decrease in the turbine power output and boost pressure. The maximum gas pressure in the cylinder of the internal combustion engine decreases accordingly, the stresses on the associated parts being lessened.

The construction of the turbocompressor according to the present invention obviates the need for release or by-pass valves and the piping to discharge the gases into the atmosphere.

Figure 3:
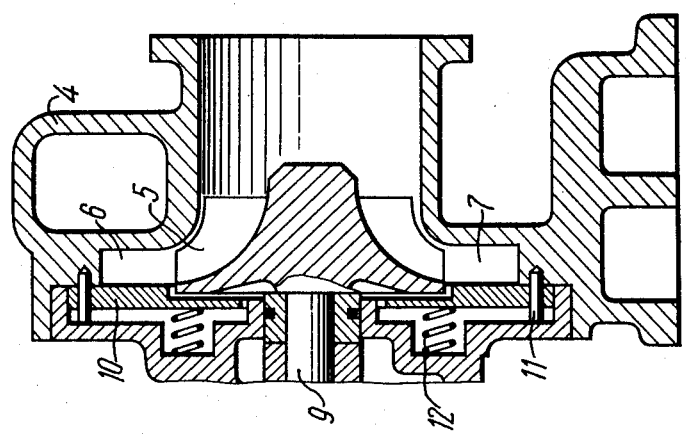
FIG. 3 shows an embodiment of the invention wherein the guides are fitted in the turbine casing.

The guides 11 prevent the disk 10 from misalignment during its axial movement. In another embodiment of the invention depicted in FIG. 3 the guides 11 are fitted in the turbine casing 4.

The range of boost pressure control is governed by the initial tension of the springs 12. Usually the initial tension of the springs 12 is chosen so as to provide for boost pressure control over the range from the maximum torque to the rated power output of the internal combustion engine.

The turbocharger employing a controlled turbine according to the present invention can be used on supercharged automotive diesel engines. It can be used with particular advantage on automobile and tractor diesel engines of low and medium power to give material improvement of the vehicle performance without increase of the engine cost, which is a point of importance in the case of mass production.

What is claimed is:

1. A turbocharger comprising: a compressor casing; a compressor impeller housed in said compressor casing; a turbine casing; a turbine wheel housed in said turbine casing; an intermediate casing which couples said compressor casing to said turbine casing; a shaft passing through said casings, said compressor impeller and turbine wheel being mounted on said shaft; two adjacent passages provided in said turbine casing, each passage serving the purpose of carrying exhaust gases to one half of said turbine wheel, and said passages being isolated from each other at the inlet to the turbine wheel; two partitions isolating said passages from each other at the inlets to said turbine wheel; a disk to protect said intermediate casing against the effects of exhaust gas heat, said disk being mounted coaxially with said shaft between said turbine casing and said intermediate casing for movement axially along said shaft and adapted to be pressed against said partitions; and springs located in said intermediate casing and pressing said disk against said partitions until the pressure in one of said passages reaches a given value, said springs then yielding to free said disk for movement axially along said shaft in opposition to said springs away from said partitions thus placing said passages in communication with each other for immediately lowering the pressure, whereby said disk not only acts to protect said intermediate casing against the effects of heat but also acts in cooperation with said springs to limit the pressure in said passages.

2. A turbocharger as claimed in claim 1, in which guides are fitted in said intermediate casing for said disk to move axially along said shaft.

3. A turbocharger as claimed in claim 1, in which guides are fitted in said turbine casing for said disk to move axially along said shaft.

* * * * *